A. WELCH. Cattle-Truck.

No. 127,443. Patented June 4, 1872.

A. WELCH.
Cattle-Truck.
No. 127,443. Patented June 4, 1872.

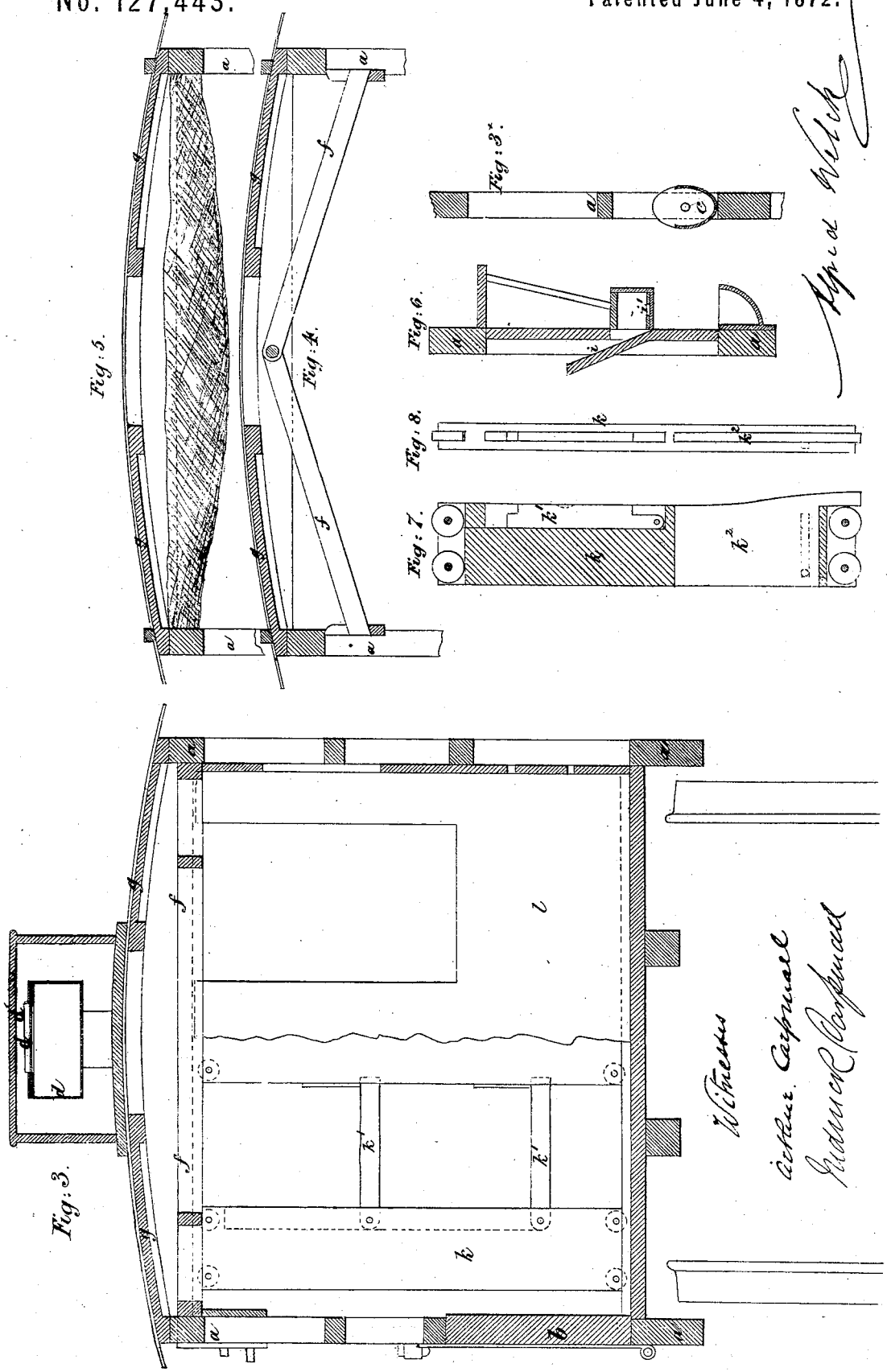
A. WELCH. Cattle-Truck.
No. 127,443. Patented June 4, 1872.
3 Sheets--Sheet 3.

UNITED STATES PATENT OFFICE.

ALFRED WELCH, OF SOUTHALL, ENGLAND.

IMPROVEMENT IN CATTLE-CARS.

Specification forming part of Letters Patent No. 127,443, dated June 4, 1872.

*To all to whom it may concern:*

Be it known that I, ALFRED WELCH, of Southall, in the county of Middlesex, England, a subject of the Queen of Great Britain, have invented or discovered new and useful "Improvements in Cattle-Trucks;" and I, the said ALFRED WELCH, do hereby declare the nature of the said invention, and in what manner the same is to be performed, to be particularly described and ascertained in and by the following statement thereof—that is to say:

In constructing cattle-trucks, or in adapting cattle-trucks now in use, so that cattle traveling by the trucks may be watered and fed in them on the journey, thereby doing away with the otherwise necessity of unloading the cattle to feed and water them and of reloading them on their journey between two given points, I introduce underneath the roof of an ordinary cattle-truck a rack or open floor, through the bars of which the cattle can draw the hay. This rack or floor is formed of metal or wood bars stretching transversely across the truck. To introduce hay or fodder upon this rack I make in the roof of the truck movable slides, which are arranged to be pushed upward toward the center of the roof, and drawn back into place again when the fodder has been introduced through them upon the rack. Racks in the ends of the truck, arranged to be filled from the outside, may also be employed; or, in place of constructing the overhead racks of bars, I sometimes form them of a net by stretching across the whole area of the truck, horizontally, beneath the roof of the truck, a strong netting of cord or other material to hold the fodder, which is supplied to it by means of movable slides in the roof of the truck. Next, for watering the cattle, I place longitudinally, resting upon the roof of the cattle-truck, a trough to serve as a reservoir for water. It is constructed with apertures upon the top of it, readily to receive the water from the engine-tank. This water, by means of pipes, I distribute to the troughs for the cattle to drink from, and which troughs I place in the ends and along the sides of the trucks.

The troughs are made of metal or wood. To prevent cattle from fouling the troughs of cattle-trucks when not required for drinking, also to uncover them readily for the cattle to drink from them, I construct them with an invertible cover, shaped to an arc of a circle, which cover works on pivots, so that it may be inverted over the trough to cover it sufficiently to prevent access to it from the interior of the car; or the trough itself may be so arranged that it can be inverted. I pave the bottom of the trucks with bricks edgewise to prevent the cattle from slipping about, and I lay the paving slightly convex to permit the moisture from the cattle to drain from the floor of the trucks through the sides of the trucks.

The above fittings to trucks in present use will permit cattle to be loaded in them in loose order and unconfined in the trucks, according to the present system.

If it be desired to divide the truck into compartments to keep the beasts separate, I use movable transverse or longitudinal slides or stalling, the bottom edges of which slide or run on metal rails, or with a flange working through a groove to readily free them from dust or other obstructions. In forming stallings or slides to keep cattle separate in trucks, and for facilitating the loading and unloading them, I make each slide or stalling in separate pieces, which can be drawn apart or pushed together, and which parts, when drawn asunder, are connected together by movable bars attached to the several portions, and forming, when connected, one rigid stalling or slide. Sometimes I make the longitudinal partitions to draw out through openings in the ends of the truck. When I employ longitudinal stalling I generally provide a separate stall for each beast. When I use a transverse stalling it is usual to divide the truck into two parts to separate the cattle into two lots, the larger from the small, whereby liability to injury in transit is much lessened.

*Description of the Drawing.*

$a\ a$ is the frame and side of the truck, and $b\ b$ are the doors. $c\ c^1$ are water-troughs in the side and end. The trough $c^1$ is made with a quadrant cover, $c^x$. It turns upside down on pivots at its ends, and can, by moving about these pivots, close or open the trough to the interior of the truck. The cover is retained in either position by a pin and catch. $c^2$ is a similar trough in the door of the truck. In place of constructing the troughs with pivoted covers, the troughs themselves may be mounted on pivots, as is shown at Fig. $3^\times$, so as to turn over upside down when out of use, in which inverted position the bottom of the trough covers the interior and protects it from being fouled. Fig. 3 is a section of a part of the end of the truck. $d$ is a water-tank on the top of the truck. $d^1$ are apertures with covers, by which it is filled at the water-cranes. $d^2$ are levers connected with a valve, by which the supply from the tank to the troughs is controlled. The levers are worked with cords from the sides of the truck. $e\ e$ are the water-pipes leading to the troughs. The pipes leading to the troughs on the doors are divided, in order not to interfere with the movement of the door. The lower part of the pipe has a funnel-like mouth, into which the other portion pours the water.

Hay is supplied to the animals by a rack, $f$, immediately under the roof, as is best seen in Fig. 3. The hay is laid upon it, sliding shutters $g\ g$ in the roof being opened for its insertion. The rack-bars may be jointed in the center and free at their outer ends to rise and fall in slots, so that they may yield should the animals strike them with their heads. This arrangement is shown at Fig. 4, which is a transverse section taken on the line 1 1, Fig. 2. Or for bars a netting may be substituted, as is seen in Fig. 5, which is a transverse section taken on the line 2 2, Fig. 2. Hay-racks in the ends of the truck may be employed, as is shown at $h$ in Fig. 2. They are supplied from the outside by a lid at the top. In Fig. 6, which is a section of a portion of the end of the truck, a hay-rack on the inside is shown, and immediately beneath it, at $i$, a hopper is shown, which can be filled with chopped food from the outside of the truck. This food will remain stored in the hopper until a slide, $i'$, which closes it at the bottom, is drawn, and the food then falls down into the water-trough and is accessible to the animals. $k\ k$ are parts of a transverse partition. They slide or run on rollers along guides. $k^1$ are bars jointed to the uprights or parts $k$. They turn down out of recesses in one upright and enter notches in the other, and are locked therein by latches; or, when the partition is not required, they turn up and allow the parts of the upright to be slidden closely together; or, in place of the bars $k^1$, the uprights may contain slides $k^2$, as is seen at Fig. 7, which is a section of one of the uprights. Fig. 8 is an edge view of the same. By means of transverse partitions the truck may be divided into any desired number of compartments. The transverse partitions may be made in two parts sliding or rolling past each other, as is seen at $l\ l$. The parts are secured in the positions required by bolts. Longitudinal partitions may be similarly arranged to divide the interior of the truck into separate stalls. Longitudinal partitions may also be arranged as is shown at $m\ m$. This partition slides or rolls along guides. Its inner end only is of the full height of the truck; the rest is lower, and is able to pass out through a slot in the end of the truck. In this way the partitions may be almost entirely withdrawn from the interior of the truck when required. The partition is jointed at $m'$, so that when withdrawn it may fold between the trucks out of the way of injury. The partitions may be made of wood or iron. Pads may be fastened onto the partitions when horses or valuable beasts are carried.

Figure 1:
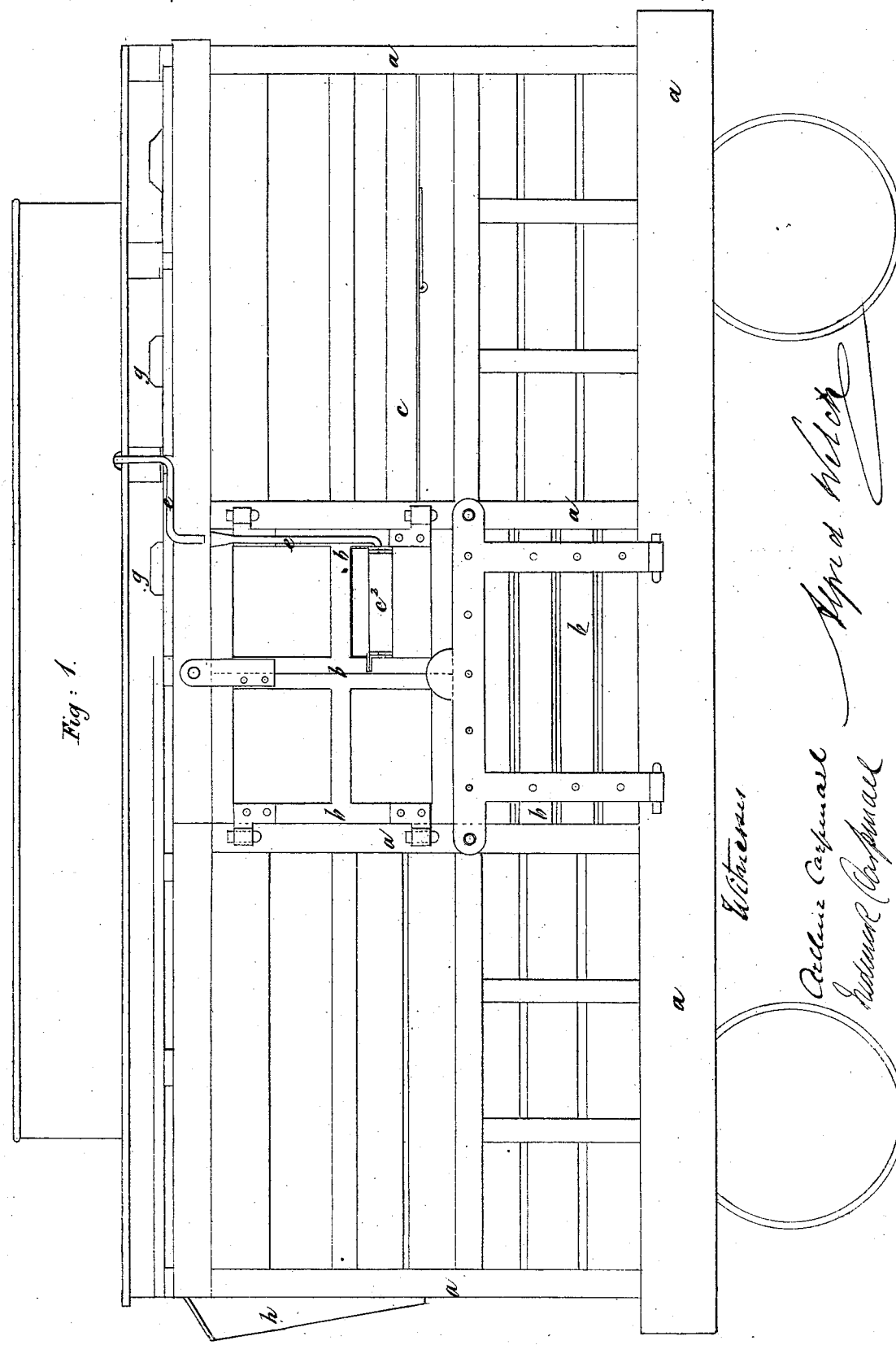
Figure 1 is a side view of a cattle-truck with my improvements applied to it.
Figure 2:
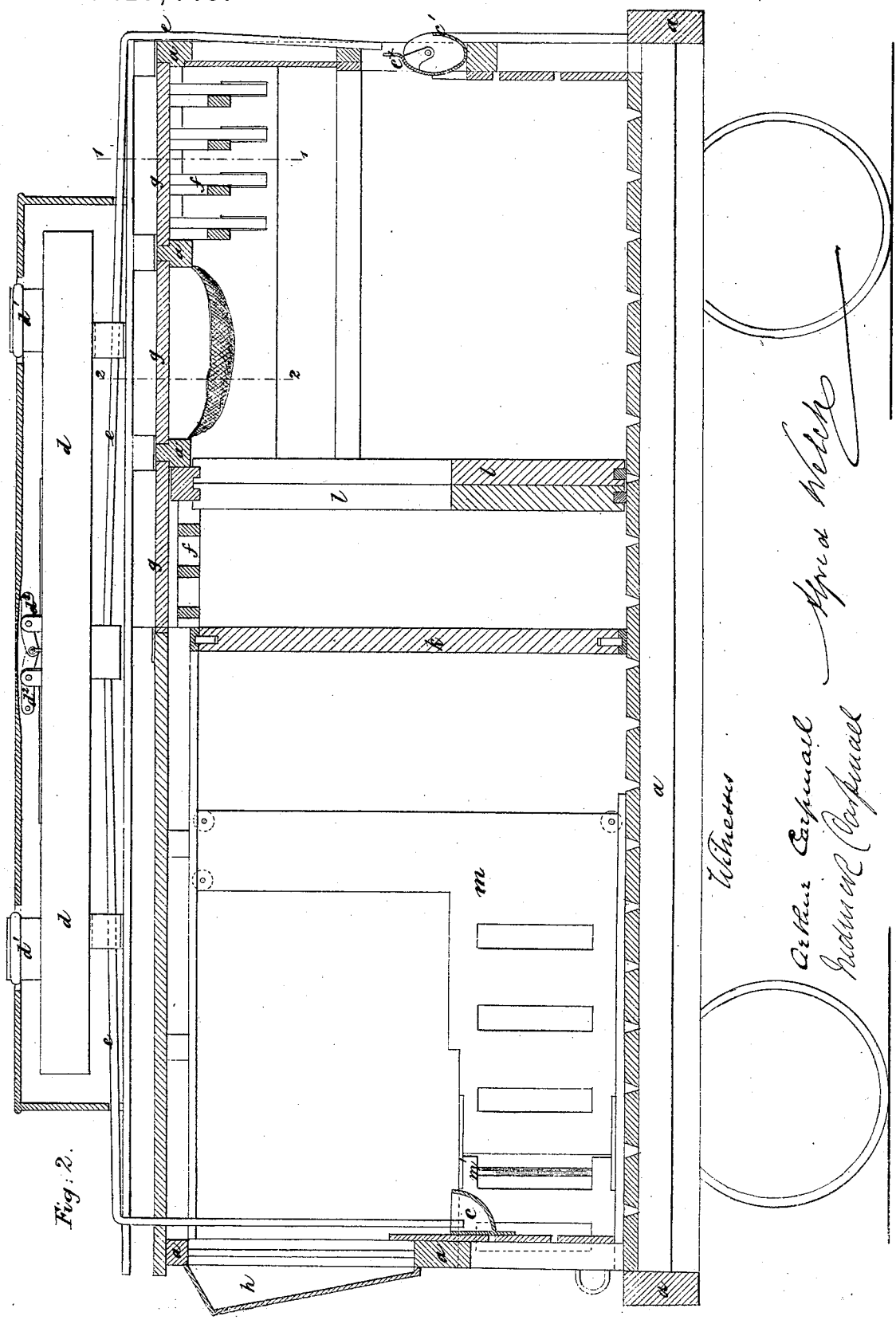
Fig. 2 is a longitudinal section, and Fig 3 a transverse section of the same.

Having thus described the nature of my said invention and the manner of performing the same, I would have it understood that what I claim is—

1. The combination, in a cattle-truck, of the overhead feed-rack and the opening above it for introducing the hay, these parts being constructed and arranged as described.

2. The combination, in a cattle-truck, of a tank, a water-trough swinging with the door of the car, and a divided supply-pipe for conducting water from the tank to the trough, substantially as set forth.

3. The combination, in a cattle-truck, of transverse partitions sliding past each other on ways with pivoted locking-bars, these parts being constructed to operate as set forth.

4. The longitudinally-sliding folding partitions, constructed and operating as set forth, to pass through and fold outside the truck.

ALFRED WELCH.

Witnesses:
JOHN DEAN,
WILMER M. HARRIS,
*Both of No. 17 Gracechurch street, London, E. C.*
JOHN HARRISON,
*Notary Public, London.*